United States Patent
Ohara

(10) Patent No.: US 11,141,693 B2
(45) Date of Patent: Oct. 12, 2021

(54) DEHUMIDIFYING ELEMENT AND DEHUMIDIFYING DEVICE HAVING SAME

(71) Applicant: SMC CORPORATION, Chiyoda-ku (JP)

(72) Inventor: Masaaki Ohara, Tsukubamirai (JP)

(73) Assignee: SMC CORPORATION, Chiyoda-ku (JP)

(*) Notice: Subject to any disclaimer, the term of this patent is extended or adjusted under 35 U.S.C. 154(b) by 229 days.

(21) Appl. No.: 16/342,583

(22) PCT Filed: Nov. 2, 2017

(86) PCT No.: PCT/JP2017/039658
§ 371 (c)(1),
(2) Date: Apr. 17, 2019

(87) PCT Pub. No.: WO2018/088310
PCT Pub. Date: May 17, 2018

(65) Prior Publication Data
US 2020/0179871 A1      Jun. 11, 2020

(30) Foreign Application Priority Data

Nov. 8, 2016 (JP) .............................. JP2016-218146

(51) Int. Cl.
*B01D 53/26* (2006.01)
*B01D 53/22* (2006.01)
(Continued)

(52) U.S. Cl.
CPC ........... *B01D 53/268* (2013.01); *B01D 53/22* (2013.01); *B01D 63/04* (2013.01);
(Continued)

(58) Field of Classification Search
None
See application file for complete search history.

(56) References Cited

U.S. PATENT DOCUMENTS

| 4,038,190 A | * | 7/1977 | Baudet | B01D 63/04 |
|---|---|---|---|---|
| | | | | 210/321.81 |
| 5,176,725 A | | 1/1993 | Puri et al. | |

(Continued)

FOREIGN PATENT DOCUMENTS

| DE | 10 2014 104 386 A1 | 10/2015 |
|---|---|---|
| JP | 6-41629 Y2 | 5/1990 |

(Continued)

OTHER PUBLICATIONS

Extended European Search Report dated May 18, 2020 in corresponding European Patent Application No. 17869975.7, 13 pages.

(Continued)

*Primary Examiner* — Jason M Greene
(74) *Attorney, Agent, or Firm* — Oblon, McClelland, Maier & Neustadt, L.L.P.

(57) ABSTRACT

A dehumidifying element includes a dehumidification space that are formed between a pair of potting material portions and that accommodates hollow fiber membranes through which highly humid dehumidification-target air is circulated. The dehumidifying element also includes an air supply hole for supplying purging air having a humidity lower than the dehumidification-target air to the dehumidification space and an air discharge hole for discharging the purging air supplied to the dehumidification space. In the dehumidification space, a guide member is disposed so as to form a plurality of regions in a cylindrical casing as viewed in the axis-L direction, and the hollow fiber membranes are accommodated in the dehumidification space so as to be distributed into the plurality of regions.

9 Claims, 6 Drawing Sheets

(51) Int. Cl.
*B01D 63/04* (2006.01)
*F24F 3/14* (2006.01)

(52) U.S. Cl.
CPC .. *B01D 2053/224* (2013.01); *F24F 2003/144* (2013.01); *F24F 2003/1435* (2013.01)

(56) References Cited

U.S. PATENT DOCUMENTS

| | | |
|---|---|---|
| 5,288,308 A | 2/1994 | Puri et al. |
| 8,042,695 B2 | 10/2011 | Ishibashi |
| 2002/0179516 A1 | 12/2002 | Behrendt et al. |
| 2006/0124531 A1 | 6/2006 | Behrendt et al. |
| 2007/0039868 A1 | 2/2007 | Ishibashi |
| 2007/0056893 A1* | 3/2007 | Noh ................. B01D 63/04 210/321.61 |
| 2010/0107880 A1 | 5/2010 | Sekiguchi |
| 2013/0306545 A1 | 11/2013 | Shinohara et al. |
| 2017/0021311 A1* | 1/2017 | Berzinis ............... B01D 53/228 |
| 2017/0113181 A1* | 4/2017 | Sinstedten ........... B01D 53/268 |

FOREIGN PATENT DOCUMENTS

| | | |
|---|---|---|
| JP | 3-165818 A | 7/1991 |
| JP | 10-31092 A | 2/1998 |
| JP | 11-33338 A | 2/1999 |
| JP | 2002-358988 A | 12/2002 |
| JP | 2004-89799 A | 3/2004 |
| JP | 2006-528067 A | 12/2006 |
| WO | WO 2009/004799 A1 | 1/2009 |
| WO | WO 2015/168392 A1 | 11/2015 |

OTHER PUBLICATIONS

International Search Report dated Jan. 16, 2018 in PCT/JP2017/039658 filed Nov. 2, 2017.

* cited by examiner

DEHUMIDIFYING ELEMENT AND DEHUMIDIFYING DEVICE HAVING SAME

TECHNICAL FIELD

The present invention relates to a dehumidifying element utilizing hollow fiber membranes and also relates to a dehumidifying device including the dehumidifying element.

BACKGROUND ART

A known dehumidifying device, which is a device for dehumidifying target air and supplying dehumidified air to a fluid-pressure device or the like, dehumidifies the dehumidification-target air by circulating the target air in the hollow fiber membranes and causing water vapor contained in the dehumidification-target air to pass out through the hollow fiber membranes. The water vapor that has passed out is discharged to the outside by using purging air. As examples of such a dehumidifying device, a Patent Literature 1 (PTL 1) and a Patent Literature 2 (PTL 2) disclose dehumidifying devices that dehumidify dehumidification-target air by circulating the target air in the hollow fiber membranes accommodated in a cylindrical casing of a dehumidifying element and by supplying and discharging purging air to and from the cylindrical casing.

In the dehumidifying devices that utilize the hollow fiber membranes, in order to dehumidify the dehumidification-target air more efficiently, it is desirable to increase the contact area between purging air and the hollow fiber membranes and thereby cause the purging air to discharge more water vapor passing through the hollow fiber membranes.

However, in the known dehumidifying devices disclosed by PTL 1 and PTL 2, the hollow fiber membranes are accommodated, generally in a bundled and twisted manner, in a dehumidification space that is formed to have a circular or annular cross section inside the cylindrical casing of the dehumidifying element. Accordingly, the hollow fiber membranes that are bent tend to cling to each other and be present unevenly in the dehumidification space of the cylindrical casing, which may cause the purging air to flow unevenly. In such a state, a sufficient contact area cannot be obtained between the purging air and the hollow fiber membranes, which may degrade the dehumidification efficiency.

CITATION LIST

Patent Literature

PTL 1: Japanese Examined Utility Model Registration Application Publication No. 6-41629
PTL 2: Japanese Unexamined Patent Application Publication No. 11-33338

SUMMARY OF INVENTION

Technical Problem

A technical problem of the present invention is, in a dehumidifying element utilizing hollow fiber membranes and in a dehumidifying device having the dehumidifying element, to suppress uneven distribution of the hollow fiber membranes in a dehumidification space in a cylindrical casing and to prevent deterioration of dehumidification efficiency.

Solution to Problem

To solve the above problem, the present invention provides a dehumidifying element that includes a hollow cylindrical casing that has casing openings at respective opposite ends thereof in an axial direction of the cylindrical casing, a plurality of hollow fiber membranes that are accommodated inside the cylindrical casing in the axial direction for circulating dehumidification-target air, a pair of potting material portions that are disposed so as to close the casing openings at the respective opposite ends of the cylindrical casing and through which respective ends of the hollow fiber membranes pass, a dehumidification space that is formed inside the cylindrical casing between the pair of potting material portions, an air supply hole for supplying purging air to the dehumidification space, and an air discharge hole for discharging the purging air from the dehumidification space. In the dehumidifying element, a guide member that divides the dehumidification space into a plurality of regions around the axis is disposed in the dehumidification space in the cylindrical casing, and the plurality of the hollow fiber membranes are accommodated in the dehumidification space so as to be distributed into the plurality of the regions.

In the dehumidifying element, it is preferable that the air supply hole be formed at a position offset to one of the potting material portions from the center of the dehumidification space in the axial direction, and that the air discharge hole be formed at a position offset to the other one of the potting material portions from the center of the dehumidification space in the axial direction. In this case, the air supply hole and the air discharge hole may be formed in the cylindrical casing.

In addition, in the dehumidifying element, the air discharge hole preferably has a larger diameter than that of the air supply hole.

In a preferred embodiment of the dehumidifying element, a plurality of the guide members are disposed radially around the axis. In this case, the guide members are preferably guide plates disposed so as to extend in the axial direction of the cylindrical casing. More preferably, the pair of the air supply hole and the air discharge hole is formed in each one of the regions divided by the plurality of the guide plates. Even more preferably, the plurality of the guide plates are disposed so as to each extend over the entire dehumidification space in the axial direction.

In the dehumidifying element, a hollow inner pipe having pipe openings at opposite ends thereof may be accommodated in the cylindrical casing in the axial direction, and the opposite ends of the inner pipe may pass through respective ones of the potting material portions, and the dehumidification space may be formed between the inner pipe and the cylindrical casing.

In the dehumidifying device that include the dehumidifying element, a capping member is attached to an end of the cylindrical casing in the axial direction. The capping member includes an inlet channel that has an inlet port for receiving the dehumidification-target air from the outside and supplies the dehumidification-target air from the inlet port to one of the casing openings, an outlet channel that has an outlet port for discharging dried air after dehumidification to the outside and guides the dried air from the other one of the casing openings to the outlet port, and a purging channel that supplies part of the dried air, as purging air, from the outlet channel to the air supply hole.

Advantageous Effects of Invention

In the dehumidifying element according to the invention and the dehumidifying device having the dehumidifying element, the guide members are disposed so as to form a plurality of regions in the dehumidification space in the cylindrical casing as viewed in the axial direction of the cylindrical casing. The hollow fiber membranes for circulating the dehumidification-target air are accommodated in the dehumidification space so as to be distributed into the regions. This suppresses uneven distribution of the hollow fiber membranes in the dehumidification space and can provide a larger contact area between the purging air and the hollow fiber membranes. As a result, deterioration of the dehumidification efficiency can be prevented.

DESCRIPTION OF EMBODIMENT

An embodiment of a dehumidifying element 1 according to the invention and a dehumidifying device 50 having the dehumidifying element 1 will be described with reference to the drawings.

Figure 1:
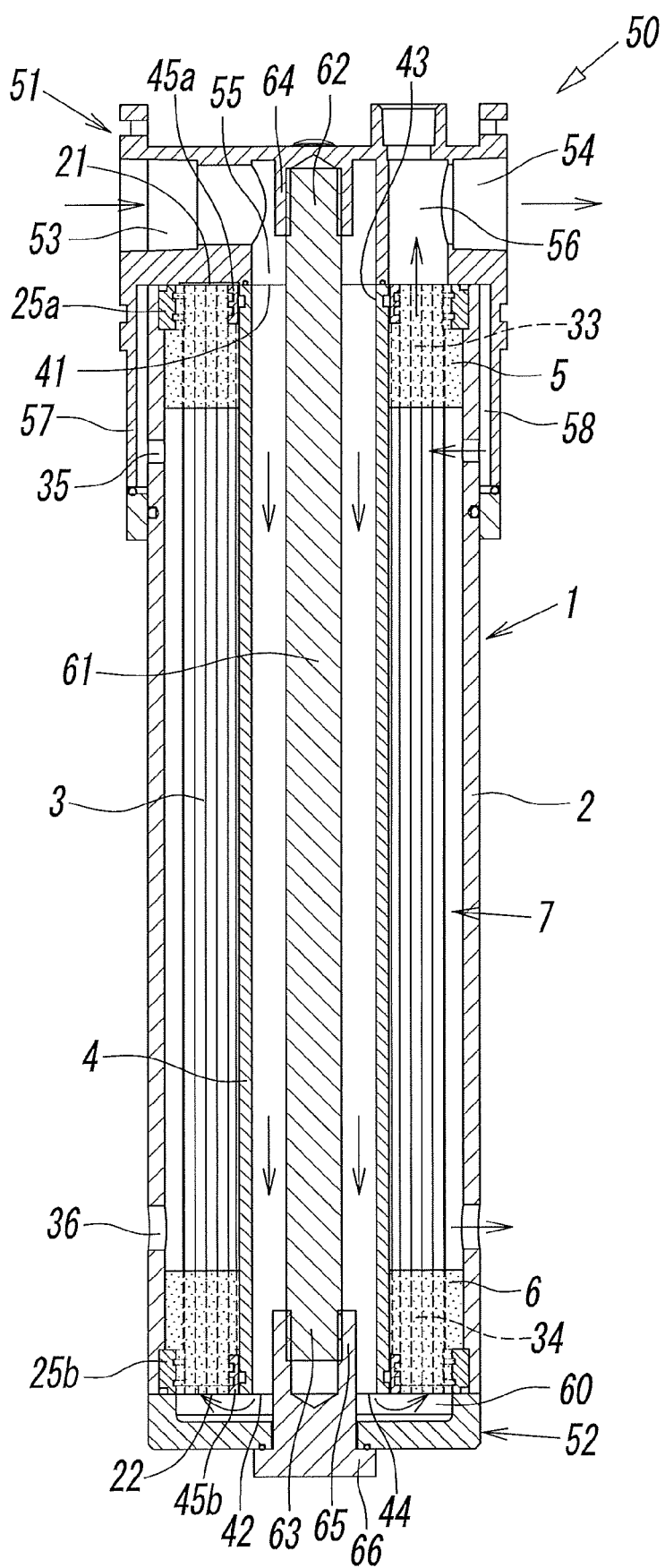
FIG. 1 is a cross-sectional view schematically illustrating a dehumidifying device having a dehumidifying element according to the invention.

As illustrated in FIG. 1, the dehumidifying device 50 according to the present embodiment includes the dehumidifying element 1 having hollow fiber membranes 3 for dehumidifying dehumidification-target air and also includes a first capping member 51 and a second capping member 52 that are detachably and airtightly attached to respective opposite ends of the dehumidifying element 1 in the axial direction thereof.

In the first capping member 51, an inlet channel 55 having an inlet port 53 and an outlet channel 56 having an outlet port 54 are formed. Highly humid dehumidification-target air that is input from the outside to the inlet port 53 is supplied through the inlet channel 55 to the dehumidifying element 1. Dried air that has been dried in the dehumidifying element 1 is output through the outlet channel 56 to the outside from the outlet port 54.

Figure 2:
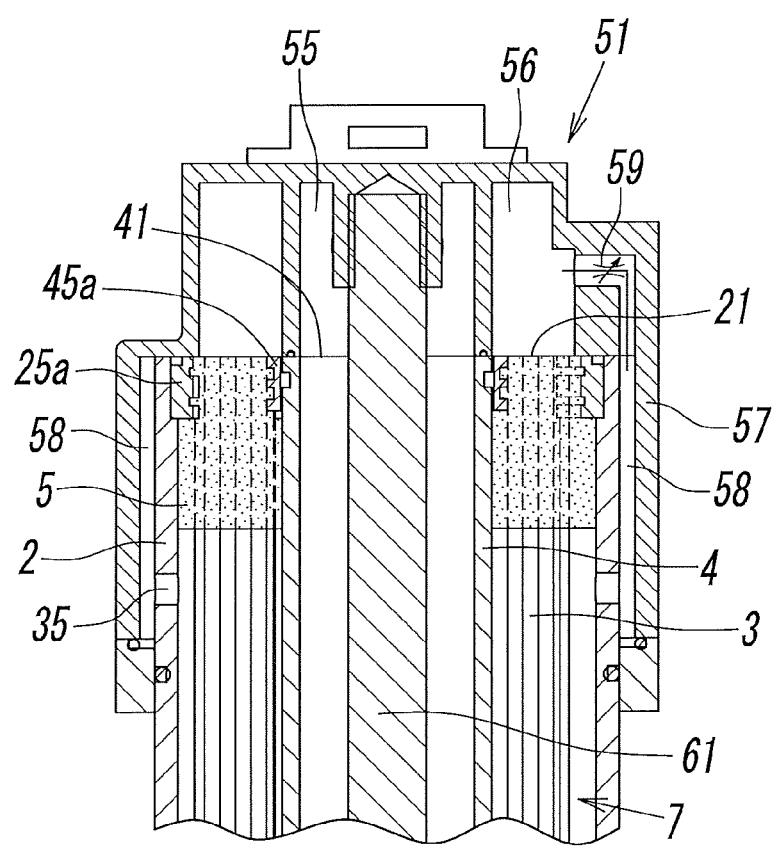
FIG. 2 is a partial cross-sectional view schematically illustrating the dehumidifying device having the dehumidifying element according to the invention.
Figure 3:
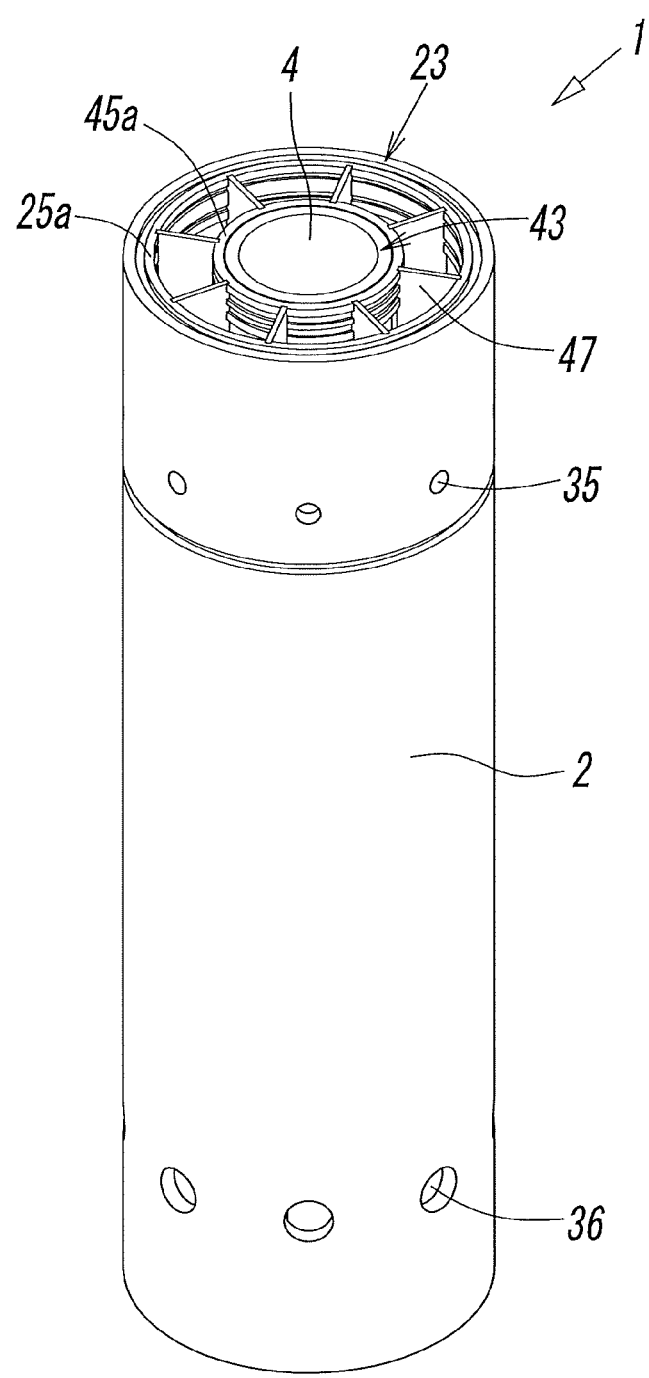
FIG. 3 is a perspective view illustrating the dehumidifying element according to the invention, from which hollow fiber membranes and a potting material portion are removed.

In addition, as illustrated in FIG. 1 and FIG. 2, the first capping member 51 has an installation wall 57 that are formed integrally with the first capping member 51. The installation wall 57 extends downward from the side wall of the first capping member 51 and is formed into an annular shape so as to airtightly cover the outer peripheral surface of one end (top end in the figure) of the dehumidifying element 1, in other words, one end of a cylindrical casing 2. An annularly shaped purging channel 58 is formed between the installation wall 57 and the dehumidifying element 1 (cylindrical casing 2). The purging channel 58 serves to supply part of the dried air coming from the outlet channel 56 to the dehumidifying element 1 as purging air having a humidity lower than the dehumidification-target air. An orifice 59, or preferably a variable orifice 59, is provided between the outlet channel 56 and the purging channel 58. The orifice 59 serves to lower the pressure of the purging air flowing from the outlet channel 56 to the purging channel 58 than that of the dried air flowing in the outlet channel 56.

As illustrated FIGS. 3 to 6, the dehumidifying element 1 includes the cylindrical casing 2, a plurality of the hollow fiber membranes 3, and a hollow inner pipe 4. The cylindrical casing 2 is formed into a hollow cylinder that extends in the axis-L direction. The hollow fiber membranes 3 are accommodated in the cylindrical casing 2 and arranged along the axis L. The hollow inner pipe 4 is formed into a cylindrical shape having a diameter smaller than the cylindrical casing 2 and is accommodated coaxially in the cylindrical casing 2. The cylindrical casing 2 has a first casing opening 21 at a first end 23 thereof, which is one end of the cylindrical casing 2 in the axis-L direction, and also has a second casing opening 22 at a second end 24, which is the other end of the cylindrical casing 2. The inner pipe 4 has a first pipe opening 41 at a first end 43 thereof, which is one end of the inner pipe 4 in the axis-L direction, and also has a second pipe opening 42 at a second end 44, which is the other end of the inner pipe 4. Accordingly, in the present embodiment, the first casing opening 21 is formed into an annular shape between the first end 23 of the cylindrical casing 2 and the first end 43 of the inner pipe 4, and the second casing opening 22 is also formed into an annular shape between the second end 24 of the cylindrical casing 2 and the second end 44 of the inner pipe 4.

A first potting material portion 5 is disposed at the first end 23 of the cylindrical casing 2. The first potting material portion, which has an annular cross section, engages and plugs the first casing opening 21. A second potting material portion 6 is disposed at the second end 24 of the cylindrical casing 2. The second potting material portion 6, which has an annular cross section, engages and plugs the second casing opening 22. The hollow fiber membranes 3 are fixed by the first potting material portion 5 in such a manner that a first end 33 of the hollow fiber membranes 3 pass through the first potting material portion 5 in the axis-L direction and reach the first casing opening 21. The inner pipe 4 is also fixed by the first potting material portion 5 in such a manner that the first end 43 of the inner pipe 4 passes airtightly through the first potting material portion 5 in the axis-L direction. Similarly, the hollow fiber membranes 3 are fixed by the second potting material portion 6 in such a manner that a second end 34 of the hollow fiber membranes 3 pass through the second potting material portion 6 in the axis-L direction and reach the second casing opening 21. The inner pipe 4 is also fixed by the second potting material portion 6 in such a manner that the second end 44 of the inner pipe 4 passes airtightly through the second potting material portion 6 in the axis-L direction. A dehumidification space 7 having an annular cross section is a space that is defined by the inner surface of the cylindrical casing 2 and the outer surface of the inner pipe 4 and that extends from the first potting material portion 5 to the second potting material portion 6 in the axis-L direction. The dehumidification space 7 accommodates a plurality of the hollow fiber membranes 3 for dehumidifying the dehumidification-target air.

Figure 6:
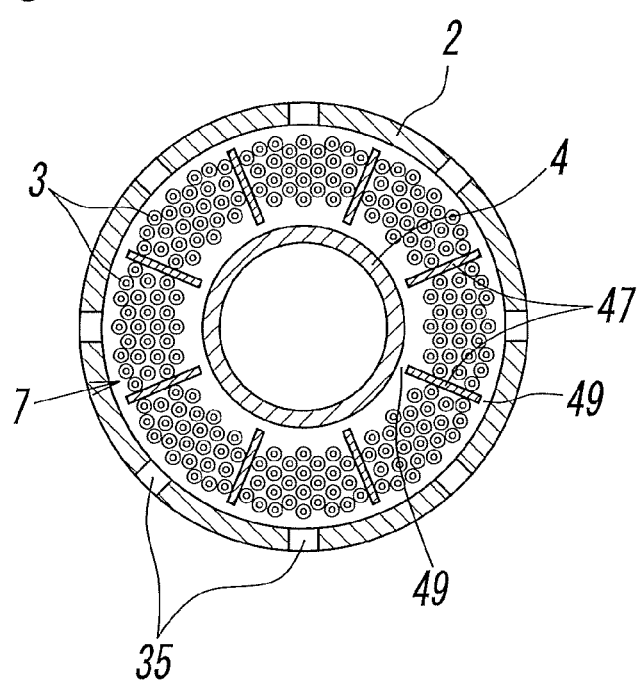
FIG. 6 is a schematic cross section of FIG. 5 viewed along line VI-VI.

A plurality of guide plates (eight plates in the present embodiment), which serve as guide members 47, are disposed radially in the dehumidification space 7 inside the cylindrical casing 2. These guide members 47 are members for positioning the hollow fiber membranes 3 within the space 7 so as to separate the hollow fiber membranes 3 into a plurality of bundles so that the hollow fiber membranes 3 are arranged substantially evenly in a balanced manner. As illustrated in FIG. 6, when this space 7 is viewed in the axis-L direction, a plurality of the guide members 47 partition the inside of the space 7 into a plurality of regions (eight regions in the present embodiment) arranged in the circumferential direction.

More specifically, each of the guide plate 47 is formed into a rectangular shape having a longitudinal direction extending parallel to the axis-L direction of the cylindrical casing 2 and a lateral direction extending radially. When the entire dehumidification space 7 is viewed in the axis-L direction, the guide plates 47 are positioned at equal angular intervals and each in a radial direction, and a plurality of sector regions (eight regions in the present embodiment) having a substantially identical area are formed in the dehumidification space 7. The hollow fiber membranes 3 are separated substantially evenly into bundles without being twisted, and the bundles of the hollow fiber membranes 3 are disposed in the respective regions. In addition, the width of each guide plate 47 in the lateral direction is slightly smaller than the distance between the inner wall of the cylindrical casing 2 and the outer wall of the inner pipe 4. Small gaps 49 are thereby formed, in the lateral direction, between the opposite ends of the guide plate 47 and respective ones of the inner wall of the cylindrical casing 2 and the outer wall of the inner pipe 4. However, if a pair of an air supply hole 35 and an air discharge hole 36 for purging air (to be described later) are provided for each of the regions, as in the present embodiment, the gaps 49 do not need to be formed.

Figure 4:
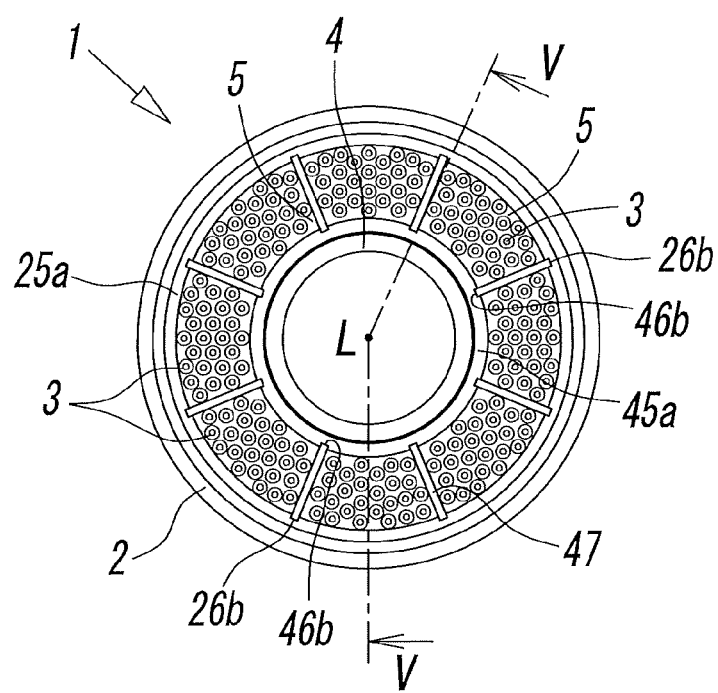
FIG. 4 is a plan view schematically illustrating the dehumidifying element according to the invention.
Figure 5:
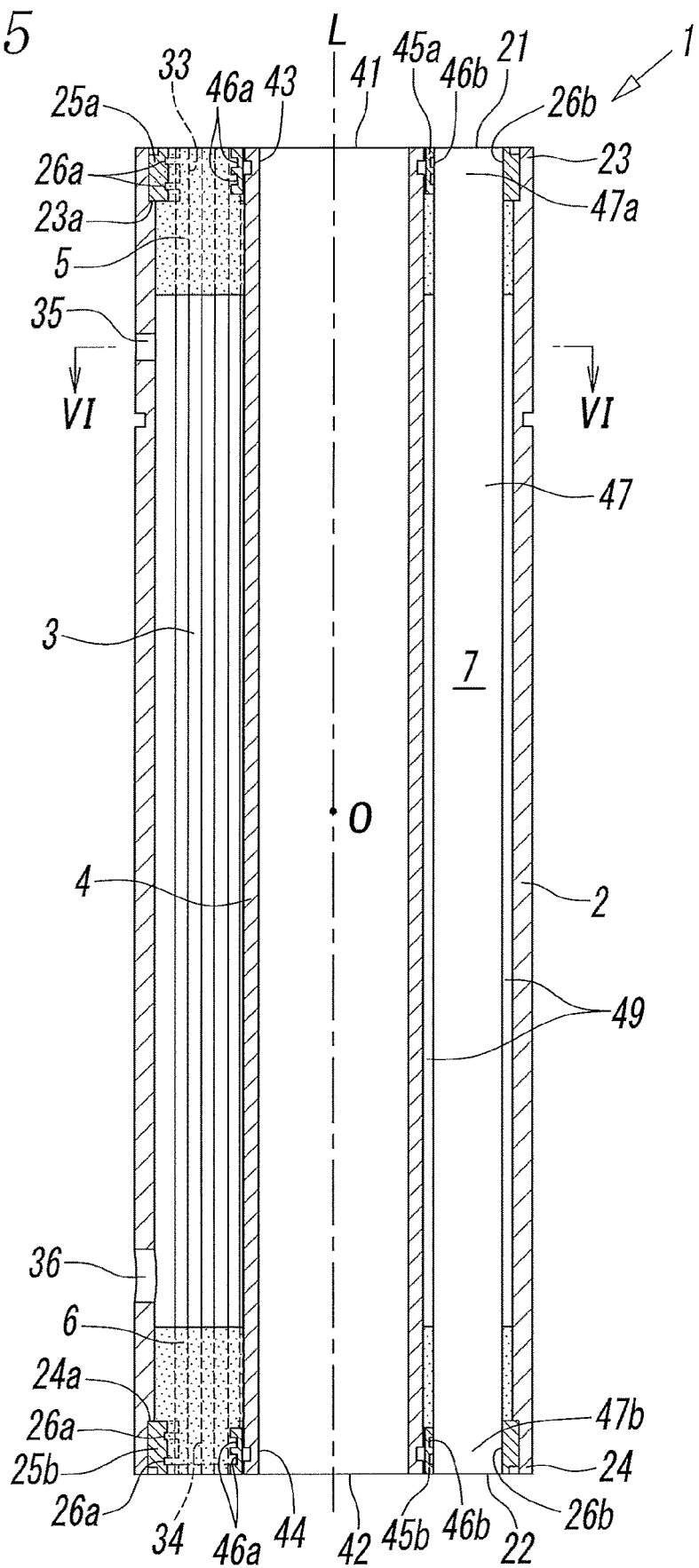
FIG. 5 is a schematic cross section of FIG. 4 viewed along line V-L-V.

In the present embodiment, outer rings 25a and 25b and inner rings 45a and 45b enable the guide plates 47 to be attached to the cylindrical casing 2 and to the inner pipe 4. The outer rings 25a and 25b are fitted airtightly into the inner wall of the cylindrical casing 2 at the first end 23 and at the second end 24, respectively, and the inner rings 45a and 45b are fitted airtightly around the outer wall of the inner pipe 4 at the first end 43 and the second end 44. In other words, as illustrated in FIGS. 4 and 5, a plurality of annular grooves 26a (two grooves in the present embodiment) and a plurality of positioning grooves 26b (the same number of the guide plates 47) are formed on each of the inner peripheral surfaces of the outer rings 25a and 25b. The annular grooves 26a extend in the circumferential direction (in a direction around the axis L) and are arranged parallel with each other in the vertical direction (in the axis-L direction). The positioning grooves 26b extend in the vertical direction and are arranged parallel with each other in the circumferential direction. A plurality of annular grooves 46a, which extend in the circumferential direction and parallel with each other in the vertical direction, and a plurality of positioning grooves 46b, which extend in the vertical direction and parallel with each other in the circumferential direction, are formed on each of the respective outer peripheral surfaces of the inner rings 45a and 45b. The positioning grooves 26b of the outer rings 25a and 25b and the positioning grooves 46b of the inner rings 45a and 45b are formed so as to face each other at the same angular positions with respect to the axis L.

The outer rings 25a and 25b and the inner rings 45a and 45b configured as described above engage inner circumferential walls and outer circumferential walls of the first and second potting material portions 5 and 6 respectively, so as to be locked in the axis-L direction with respect to the first and second potting material portions 5 and 6 due to the material portions thereof entering the annular grooves 26a and 46a. As illustrated in FIGS. 4 and 5, a first end 47a, which is one end of each of the guide plates 47, and a second end 47b, which is the other end thereof, are embedded in the potting material portions 5 and 6, while respective laterally opposing ends of the first end 47a and the second end 47b engage positioning grooves 26b and 46b of the outer rings 25a and 25b and the inner rings 45a and 45b. These guide plates 47 are thereby positioned radially and fixed by the potting material portions 5 and 6. Thus, in the present embodiment, the guide plates 47 are disposed so as to each extend over the entire length of the dehumidification space 7 in the axis-L direction.

Annular steps 23a and 24a are formed on the respective inner walls of the first end 23 and the second end 24 of the cylindrical casing 2, and the outer rings 25a and 25b engage the annular steps 23a and 24a, respectively. Things accommodated in the cylindrical casing 2, such as the hollow fiber membranes 3, the potting material portions 5 and 6, and guide plates 47, are thereby fixed in the axis-L direction with respect to the cylindrical casing 2.

Note that the guide plates 47 may be formed integrally with, for example, the inner pipe 4. In this case, the inner rings 45a and 45b need not necessarily be disposed.

The air supply holes 35 and the air discharge holes 36 are formed in the dehumidifying element 1 at one end thereof and at the other end in the axis-L direction of the dehumidification space 7, respectively. The air supply holes 35 are connected to the purging channel 58 to supply purging air to the dehumidification space 7, and the discharge holes 36 are provided to discharge the purging air from the dehumidification space 7 to the outside. More specifically, the air supply holes 35 are formed in the cylindrical casing 2 at positions between the first potting material portion 5 and a center O of the dehumidifying element 1 in the axis-L direction (in other words, the dehumidification space 7 in the axial direction), and the outlet air discharge holes 36 are formed in the cylindrical casing 2 at positions between the second potting material portion 6 and the center O.

Moreover, pairs of each air supply hole 35 and each air discharge hole 36 are provided in the cylindrical casing 2 at equal angular intervals (45-degree intervals in the present embodiment) in the circumferential direction thereof. Accordingly, each pair of the air supply hole 35 and the air discharge hole 36 is provided in each one of the regions (eight regions in the present embodiment) that are formed by the guide plates 47 in the dehumidification space 7. The air discharge holes 36 are formed so as to have a larger diameter, in other words, a larger opening area than the air supply holes 35, and thereby the pressure of the purging air circulating in the dehumidification space 7 can be prevented from increasing. In addition to the effects of the orifice 59 described above, maintaining the pressure of the purging air at a lower level in the dehumidification space 7 enables water vapor in the dehumidification-target air circulating in the hollow fiber membranes 3 to efficiently pass out through the hollow fiber membranes 3, which results in an improvement in the dehumidification efficiency of dehumidifying element 1. Note that the size of the air supply holes 35 and the size of the air discharge holes 36 are not necessarily different but may be the same.

As illustrated in FIG. 1, a connection rod 61 for fixing the first and second capping members 51 and 52 with respect to the dehumidifying element 1 is inserted in the inner pipe 4 in the axis-L direction, and the connection rod 61 has a first male thread 62 and a second male thread 63 formed at one end and at the other end thereof in the axis-L direction. On the other hand, the first capping member 51 has a first female thread 64 on the inside surface thereof. The second capping member 52 is formed into an annular shape and has a center hole into which a second female thread 65 of a fastening bolt 66 is inserted. While the first male thread 62 of the connection rod 61 is engaged with the first female thread 64 and the second male thread 63 is engaged with the second female thread 65, the first and second capping members 51 and 52 are fastened together to the dehumidifying element 1 by fastening the fastening bolt 66 airtightly.

Next, a specific description will be given of a configuration of flow channels formed in the dehumidifying device 50 for dehumidification-target air, dried air after dehumidified, and purging air, as well as advantageous effects.

The inlet channel 55 formed in the first capping member 51 is connected to the first pipe opening 41 of the inner pipe 4 disposed in the dehumidifying element 1.

A recess is formed in the inside surface of the second capping member 52 so as to serve as a connection channel 60. The connection channel 60 connects the second pipe opening 42 of the inner pipe 4 to the second casing opening 22 that is positioned next to the second pipe opening 42 in the radial direction and at which the hollow fiber membranes 3 open.

Similarly, the outlet channel 56 formed in the first capping member 51 is connected to the first casing opening 21 that is positioned next to the first pipe opening 41 in the radial direction and at which the hollow fiber membranes 3 open. Here, the first casing opening 21 and the first pipe opening 41 are separated airtightly by the first capping member 51.

In addition, as described above, the purging channel 58 branched from the outlet channel 56 is connected to the dehumidification space 7 via the air supply holes 35, and the dehumidification space 7 is open to atmosphere via the air discharge holes 36.

In the dehumidifying device 50 having such a flow channel configuration, highly humid dehumidification-target air flowing into the inlet channel 55 from piping (not illustrated) connected to the inlet port 53 of the first capping member 51 is introduced to the connection channel 60 of the second capping member 52 through the inner pipe 4.

The dehumidification-target air changes its course at the connection channel 60 and is introduced to the hollow fiber membranes 3 from the second casing opening 22 of the dehumidifying element 1. The dehumidification-target air is dehumidified while flowing in the hollow fiber membranes 3 due to difference in partial pressure of water vapor (difference in water vapor concentration) between the dehumidification-target air and the purging air flowing around the hollow fiber membranes 3 in the dehumidification space 7. In other words, due to the difference in partial pressure of water vapor, the water vapor contained in the dehumidification-target air inside the hollow fiber membranes passes out through the hollow fiber membranes, and the purging air removes the water vapor that has passed. Thus, the dehumidification-target air is dehumidified.

Dried air after dehumidification flows from the first casing opening 21 of the dehumidifying element 1 to the outlet channel 56 and consequently to a desired pneumatic device or the like through piping (not illustrated) connected to the outlet port 54. Part of dried air after dehumidification flowing in the outlet channel 56 is branched as the purging air from the outlet channel 56, depressurized at the orifice 59, and supplied to the dehumidification space 7 of the dehumidifying element 1 through the purging channel 58 and the air supply holes 35. The purging air subsequently circulates in the dehumidification space along the axis L and takes water vapor out of the dehumidification-target air that has passed through the hollow fiber membranes 3. Consequently, the purging air is discharged to atmosphere through the air discharge holes 36.

The dehumidification space 7 are divided by a plurality of the guide plates 47 disposed radially (eight plates in the present embodiment) into regions (eight regions in the present embodiment) the number of which is equal to the number of the guide plates 47. The hollow fiber membranes 3 are accommodated in the dehumidification space 7 so as to be distributed substantially evenly into these regions. This suppresses uneven distribution of the hollow fiber membranes 3 in the dehumidification space 7 and can provide a larger contact area between the purging air and the hollow fiber membranes 3. As a result, the water vapor of the dehumidification-target air that has passed out through the hollow fiber membranes 3 can be removed more efficiently by the purging air, which can prevent deterioration of the dehumidification efficiency. Moreover, a pair of the air supply hole 35 and the air discharge hole 36 is provided in each of the regions formed by the guide plates 47. As a result, the flow of the purging air is made more uniform, which enables the purging air to remove and discharge the water vapor more efficiently.

The dehumidifying element according to the invention and the dehumidifying device that uses the dehumidifying element have been described in detail. The invention, however, is not limited to the above embodiment but is subject to a variety of design alterations insofar as such alterations fall within the scope of the appended claims.

For example, in the present embodiment, the guide members of the dehumidifying element 1 are described as the guide plates 47 each of which extends in the radial direction. However, the guide members may be configured differently insofar as the guide members are disposed so as to form a plurality of regions in the dehumidification space 7 when the entire dehumidification space 7 of the cylindrical casing 2 is viewed in the axis-L direction. For example, the guide members 47 may be a plurality of stick-shaped guide pins that are erected from the outer wall of the inner pipe 4 and disposed helically in the axis-L direction so that the guide pins are disposed radially when the dehumidification space 7 is viewed in the axis-L direction. In this case, the hollow fiber membranes 3 can be positioned and distributed in a plurality of regions formed by the adjacent guide pins as viewed in the axis-L direction, which can suppress the uneven distribution of the hollow fiber membranes 3 in the dehumidification space 7.

In addition, in the present embodiment, a pair of the air supply hole 35 and the air discharge hole 36 that supply and discharge purging air to and from the dehumidification space 7 are provided in each of the regions that are divided by the guide plates 47. However, the number of the pairs of the supply holes 35 and the discharge holes 36 may be set smaller than the number of the regions, or the number of the holes 35 and the number of the holes 36 may be set different from each other, insofar as the purging air is circulated sufficiently and the purging air is supplied from the air supply hole 35 and discharged to the air discharge hole 36 smoothly in each region in the dehumidification space 7.

Moreover, in the present embodiment, both the inlet channel 55 for the dehumidification-target air and the outlet channel 56 for the dried air are formed in the first capping member 51. However, one of the inlet channel 55 and the outlet channel 56 may be formed in the first capping member 51, and the other may be formed in the second capping member 52. In this case, the inner pipe 4 may be omitted from the dehumidifying element 1, or alternatively, the inner pipe 4 may be utilized as the purging channel 58 by, for example, closing one end of the inner pipe 4 airtightly, and the air supply holes 35 for the purging air may be formed in the inner pipe 4. Furthermore, the capping members 51 and 52 may be undetachable with respect to the dehumidifying element 1.

Furthermore, the guide members 47 need not be disposed radially around the axis L when the dehumidification space 7 is viewed in the axis-L direction, but may be disposed, for example, in a grid-like manner.

REFERENCE SIGNS LIST 1 dehumidifying element
2 cylindrical casing
3 hollow fiber membranes
4 inner pipe
5 first potting material portion
6 second potting material portion
7 dehumidification space
21 first casing opening of cylindrical casing
22 second casing opening of cylindrical casing
23 first end of cylindrical casing
24 second end of cylindrical casing
23a, 24a annular step
25a, 25b outer ring
26a annular groove of outer ring
26b positioning groove of outer ring
33 first end of hollow fiber membranes
34 second end of hollow fiber membranes
35 air supply hole for purging air
36 air discharge hole for purging air
41 first pipe opening of inner pipe
42 second pipe opening of inner pipe
43 first end of inner pipe
44 second end of inner pipe
45a, 45b inner ring
46a annular groove of inner ring
46b positioning groove of inner ring
47 guide plate (guide member)
47a first end of guide plate
47b second end of guide plate
49 gap
50 dehumidifying device
51 first capping member
52 second capping member
53 inlet port
54 outlet port
55 inlet channel
56 outlet channel
58 purging channel
59 orifice
60 connection channel
61 connection rod
62 first male thread
63 second male thread
64 first female thread
65 second female thread
66 fastening bolt
L axis
O center in the axial direction

The invention claimed is:

1. A dehumidifying element, comprising:
a hollow cylindrical casing that has casing openings at respective opposite ends thereof in an axial direction of the cylindrical casing;
a plurality of hollow fiber membranes that are accommodated inside the cylindrical casing in the axial direction for circulating dehumidification-target air;
a pair of potting material portions that are disposed so as to close casing openings at the respective opposite ends of the cylindrical casing and through which respective ends of the hollow fiber membranes pass;
a dehumidification space that is formed inside the cylindrical casing between the pair of potting material portions;
air supply holes for supplying purging air to the dehumidification space; and
air discharge holes for discharging the purging air from the dehumidification space, wherein
a guide plate that divides the dehumidification space into a plurality of regions around an axis of the cylindrical casing is disposed in the dehumidification space in the cylindrical casing,
at least one of the air supply holes and at least one of the air discharge holes is formed in each one of the plurality of regions,
the air supply holes communicate with an annular purging channel surrounding the cylindrical casing, the purging air is supplied to the air supply holes through the purging channel, and
the plurality of the hollow fiber membranes are accommodated in the dehumidification space so as to be distributed into the plurality of the regions.

2. The dehumidifying element according to claim 1, wherein
the air supply holes are respectively formed at a position offset to one of the potting material portions from a center of the dehumidification space in the axial direction, and
the air discharge holes are respectively formed at a position offset to an other one of the potting material portions from the center of the dehumidification space in the axial direction.

3. The dehumidifying element according to claim 2, wherein the air supply holes and the air discharge holes are formed in the cylindrical casing.

4. The dehumidifying element according to claim 1, wherein the air discharge holes have a larger diameter than that of the air supply holes.

5. The dehumidifying element according to claim 1, wherein a plurality of the guide plates are disposed radially around the axis.

6. The dehumidifying element according to claim 5, the guide plates extend in the axial direction of the cylindrical casing.

7. The dehumidifying element according to claim 5, wherein the plurality of the guide plates are disposed so as to each extend over an entire dehumidification space in the axial direction.

8. The dehumidifying element according to claim 1, wherein
a hollow inner pipe having pipe openings at opposite ends thereof is accommodated in the cylindrical casing in the axial direction, the opposite ends of the inner pipe passing through respective ones of the potting material portions, and
the dehumidification space is formed between the inner pipe and the cylindrical casing.

9. A dehumidifying device, comprising:
the dehumidifying element according to claim 1; and
a capping member attached to an end of the cylindrical casing in the axial direction, the capping member including
an inlet channel that has an inlet port for receiving the dehumidification-target air from the outside and supplies the dehumidification-target air from the inlet port to one of the casing openings, an outlet channel that has an outlet port for discharging dried air after dehumidification to the outside and guides the dried air from the other one of the casing openings to the outlet port, and the purging channel that supplies part of the dried air, as the purging air, from the outlet channel to the air supply holes.

\* \* \* \* \*